US012090751B2

(12) United States Patent
Watanabe et al.

(10) Patent No.: US 12,090,751 B2
(45) Date of Patent: Sep. 17, 2024

(54) RECORDING APPARATUS

(71) Applicant: CANON KABUSHIKI KAISHA, Tokyo (JP)

(72) Inventors: Hikaru Watanabe, Tokyo (JP); Kengo Nieda, Kanagawa (JP); Ryo Harigae, Tokyo (JP); Kohei Fukui, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/101,411

(22) Filed: Jan. 25, 2023

(65) Prior Publication Data

US 2023/0241906 A1 Aug. 3, 2023

(30) Foreign Application Priority Data

Jan. 28, 2022 (JP) ................................ 2022-012084

(51) Int. Cl.
*B41J 11/70* (2006.01)
*B41J 11/00* (2006.01)

(52) U.S. Cl.
CPC .............. *B41J 11/70* (2013.01); *B41J 11/006* (2013.01); *B41J 11/0095* (2013.01)

(58) Field of Classification Search
CPC ....... B41J 11/70; B41J 11/006; B41J 11/0095; B41F 1/28; B41F 1/04; B41F 5/02; B41F 5/24; B41F 5/04
See application file for complete search history.

(56) References Cited

U.S. PATENT DOCUMENTS

| | | | | | |
|---|---|---|---|---|---|
| 5,028,965 | A * | 7/1991 | Kinoshita | G03G 15/6579 | 399/370 |
| 5,144,386 | A * | 9/1992 | Matsuo | G03G 15/652 | 399/381 |
| 5,328,280 | A * | 7/1994 | Ito | B41J 11/50 | 400/625 |
| 2012/0056365 | A1* | 3/2012 | Kato | B41J 11/006 | 271/9.1 |
| 2023/0264495 | A1* | 8/2023 | Fukui | B41J 11/005 | 347/104 |

FOREIGN PATENT DOCUMENTS

JP 2004-167684 A 6/2004

* cited by examiner

*Primary Examiner* — David H Banh
(74) *Attorney, Agent, or Firm* — Venable LLP

(57) ABSTRACT

A recording apparatus includes a recording portion that records an image on a sheet, a first conveyance path in which a cut sheet serving as the sheet is conveyed toward the recording portion, a second conveyance path in which a continuous sheet serving as the sheet is conveyed toward the recording portion, a common conveyance path in which the sheet is conveyed in a conveying direction from a junction point at which the first conveyance path and the second conveyance path join together to the recording portion, and a control portion that controls the conveyance of the sheet. When the sheet is not detected in the second conveyance path after a sheet conveyance abnormality is detected, while the sheet is detected in the common conveyance path, the control portion performs a discharge operation of conveying the cut sheet from the first conveyance path toward the recording portion.

16 Claims, 13 Drawing Sheets

RECORDING APPARATUS

BACKGROUND OF THE INVENTION

Field of the Invention

The present invention relates to a recording apparatus that performs recording on a sheet.

Description of the Related Art

As an example of a jam handling method for a sheet in a recording apparatus that performs recording (printing) on a sheet such as recording paper, there is a method in which, when a sheet has remained in a sheet conveyance path for a predetermined or longer time period, it is determined that a jam has occurred as a sheet conveyance abnormality, and a conveyance roller is rotated in a paper discharge direction to discharge the sheet and thereby perform jam handling. Japanese Patent Application Publication No. 2004-167684 discloses a recording apparatus that performs, when a doubly-fed subsequent sheet remains in a detecting range of a sheet detecting sensor, conveyance control to discharge the detected subsequent sheet.

SUMMARY OF THE INVENTION

As a current-day recording apparatus, a recording apparatus capable of performing recording on various types of recording paper in such a mode as to allow paper passage of not only cut sheets such as single-sheet paper, but also a continuous sheet such as roll paper is in demand. The above-mentioned control described in Japanese Patent Application Publication No. 2004-167684 is control assuming the single-sheet paper as the cut sheets separated from each other in advance, and is not control directly applicable to continuous paper as a continuous sheet from which a recorded region is separated from a non-recorded region to be discharged. If the above-mentioned control is directly applied to a case where the continuous paper is passed, the continuous paper is discharged more than necessary to undesirably increase waste paper.

An object of the present invention is to provide a technology that allows appropriate conveyance abnormality handling in a recording apparatus selectively switchable between recording on cut sheets and recording on a continuous sheet.

To attain the object described above, a recording apparatus in the present invention includes:

a recording portion that records an image on a sheet;

a first conveyance path in which a cut sheet serving as the sheet is conveyed toward the recording portion;

a second conveyance path in which a continuous sheet serving as the sheet is conveyed toward the recording portion;

a common conveyance path in which the sheet is conveyed in a conveying direction from a junction point at which the first conveyance path and the second conveyance path join together to the recording portion; and a control portion that controls the conveyance of the sheet, wherein, in a case where the sheet is not detected in the second conveyance path after a sheet conveyance abnormality is detected, while the sheet is detected in the common conveyance path, the control portion performs a discharge operation of conveying the cut sheet from the first conveyance path toward the recording portion.

According to the present invention, it is possible to allow appropriate conveyance abnormality handling in a recording apparatus selectively switchable between recording on cut sheets and recording on a continuous sheet.

Further features of the present invention will become apparent from the following description of exemplary embodiments with reference to the attached drawings.

DESCRIPTION OF THE EMBODIMENTS

Figure 1:
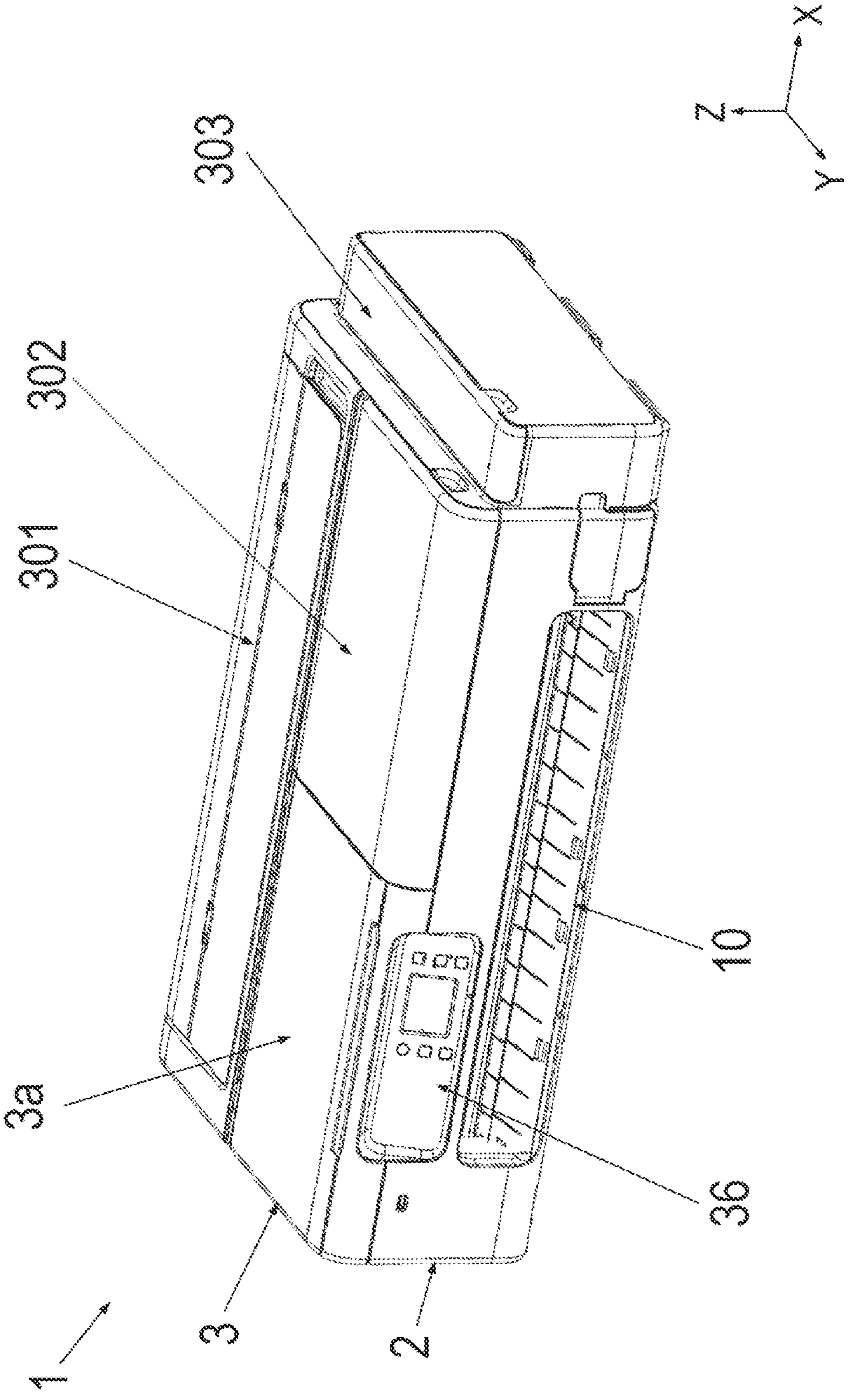
FIG. 1 is an outer appearance perspective view of a recording apparatus according to an embodiment of the present invention.

Referring to the drawings, modes for carrying out the present invention will be described below in detail by way of example on the basis of an embodiment example. Note that dimensions, materials, shapes, relative positioning, and the like of components described in this embodiment are to be appropriately changed in accordance with a configuration of an apparatus to which the invention is applied and with various conditions, and are therefore not intended to limit the scope of the invention to the following embodiment. While a plurality of features are described in the embodiment, it does not necessarily mean that all such features are indispensable to the invention, and the plurality of features may also be combined as appropriate. Furthermore, in the attached drawings, the same reference numerals are given to the same or similar configurations, and redundant description thereof is omitted.

Embodiment

Outline of Recording Apparatus

FIG. 1 is an outer appearance perspective view obtained by viewing a recording apparatus (printing apparatus) 1 according to an embodiment of the present invention on a front side of the apparatus. Note that each of FIG. 1 and FIGS. 2 and 3 described later illustrates a structural arrangement in a state where the recording apparatus 1 is placed on a horizontal mounting surface as a normally assumed mounting state. In other words, an X-direction and a Y-direction in each of the figures correspond to horizontal directions perpendicular to each other and, in particular, the X-direction is a width direction (lateral direction) of the recording apparatus 1, while the Y-direction is a depth direction (a +Y-direction is on an apparatus front or front surface side, while a −Y-direction is on an apparatus depth or rear surface side) of the recording apparatus 1. Meanwhile, a Z-direction corresponds to an apparatus vertical direction (a +Z-direction is an upward direction, while a −Z-direction is a downward direction), i.e., a gravity direction or a perpendicular direction.

The recording apparatus 1 in the present embodiment is an ink-jet-type (liquid-ejection-type) recording apparatus that ejects ink as recording liquid to perform recording on a sheet serving as a recording medium, but the present invention is also applicable to various recording apparatus other than an ink-jet recording apparatus.

Note that "recording" includes not only a case where significant information such as a character or graphic pattern is formed, but also a case where an image, design, or pattern is formed on a recording medium in a broader sense or the medium is processed regardless of whether the information is significant or insignificant or is made visible to allow human visual perception. In the present embodiment, it is assumed that a cut sheet corresponding to a single-sheet recording medium is single-sheet paper and a continuous sheet corresponding to a continuous recording medium is continuous paper. The single-sheet paper is recording paper in a form separated from subsequent recording paper before conveyance is started. The continuous paper is recording paper held/contained in a containing portion in a form not separated from subsequent recording paper at least when conveyance is started. Typical examples include a form of a roll sheet such as roll paper in which a continuous sheet is wound, but the continuous paper may also be held/contained in the form of a folded sheet such as folded paper. In addition, effects of the present invention are not limited to a case where the recording medium is paper, but are also applicable to a film-type recording medium, fabric, or the like.

The recording apparatus 1 has a flat rectangular parallelepiped shape as a whole, and includes an apparatus main body 2 and a main body cover portion 3 including a plurality of covers. The main body cover portion 3 is provided so as to cover the apparatus main body 2 to form a top portion of the recording apparatus 1. In the main body cover portion 3 in the present embodiment, a paper feeding cover 301 for setting a recording medium, an access cover 302 for allowing a maintenance operation to be performed inside the apparatus, and a tank access cover 303 covering a portion of the apparatus that feeds ink to a tank are present. It may also be possible to provide a configuration in which a reading unit (scanner unit) **3*a* that reads an image of a document is provided, and the entire reading unit 3*a* makes an opening/closing movement similarly to the access cover 302 to allow the maintenance operation to be performed inside the apparatus. A front part of the recording apparatus 1 is formed with a discharge portion 10 from which the recorded recording medium is discharged. The front part of the recording apparatus 1 is also formed with an operation unit 36 that receives an operation by an operator (user). The operation unit 36 includes a touch-panel-type display portion to not only receive an input operation by the operator, but also display information to the operator. In the present embodiment, the operation unit 36** functions as a notifying portion that performs notifying to encourage the user to perform jam handling as conveyance abnormality handling and as an input portion that receives an input of completion of the jam handling from the user.

Figure 2:
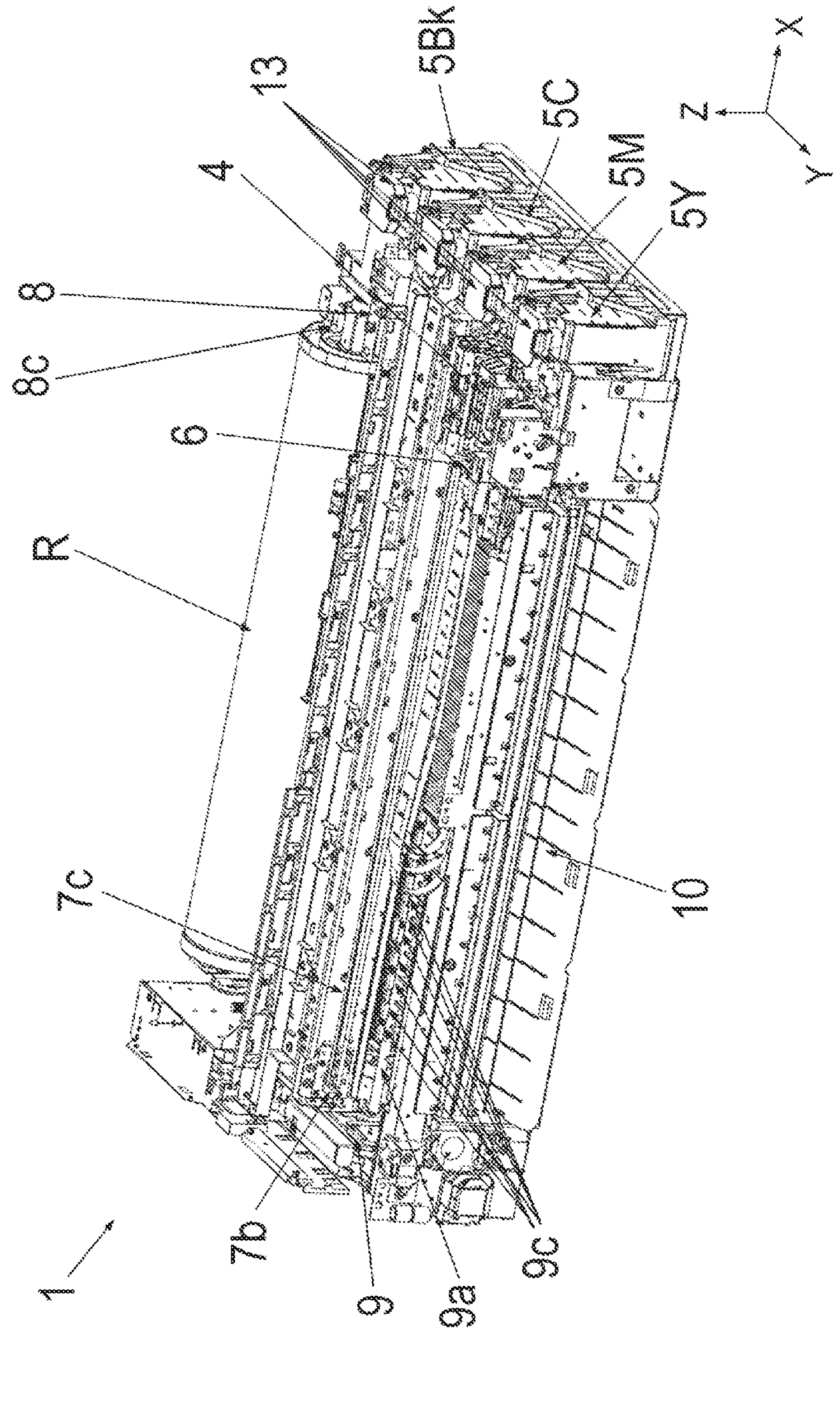
FIG. 2 is a perspective view illustrating an inner mechanism of the recording apparatus in FIG. 1.
Figure 3:
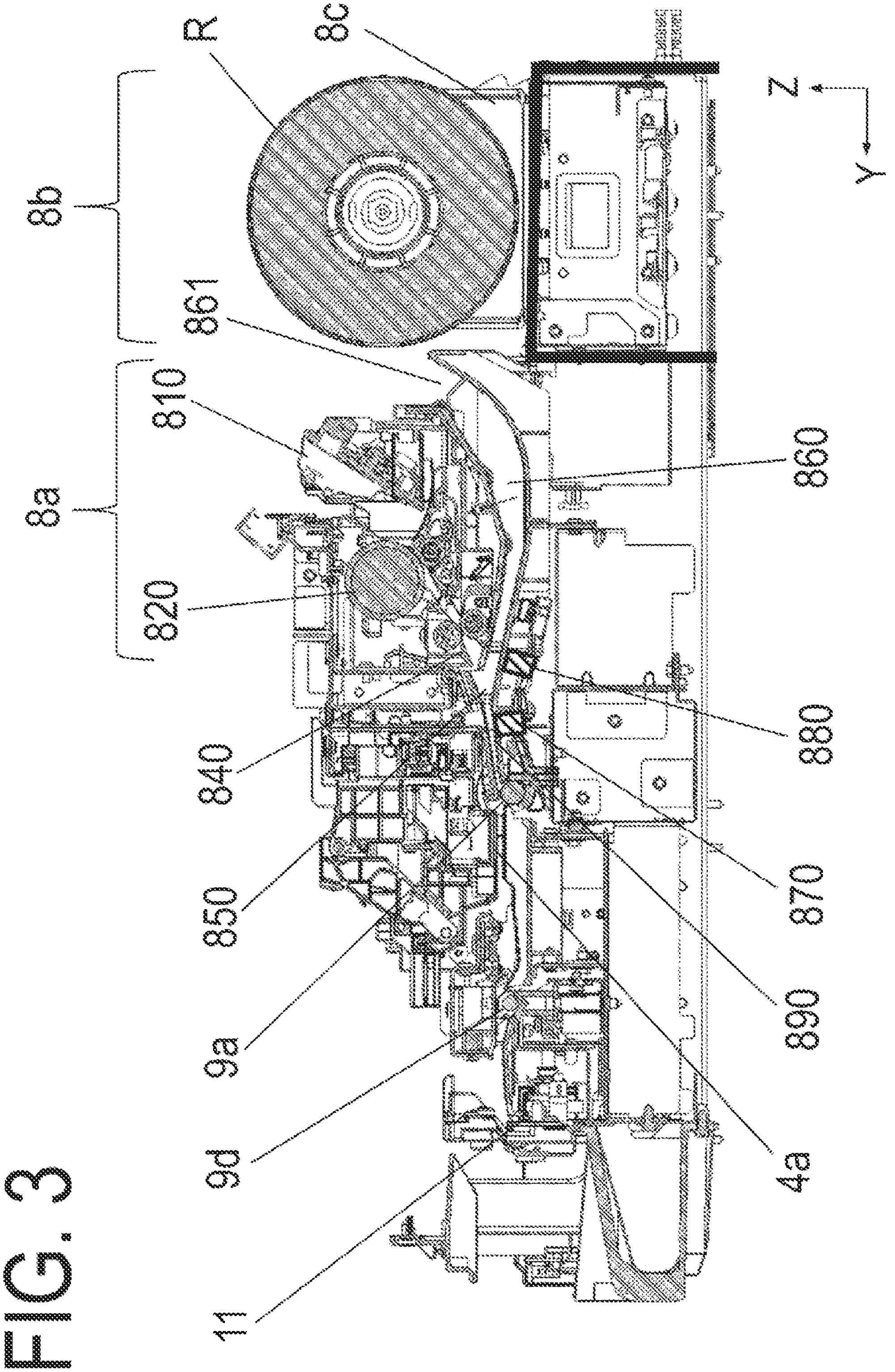
FIG. 3 is a cross-sectional view according to a recording paper conveyance path in the present embodiment.

Referring to FIGS. 2 and 3, a description will be given of an inner mechanism of the recording apparatus 1. FIG. 2 is a perspective view illustrating the inner mechanism of the recording apparatus 1. FIG. 3 is a schematic cross section illustrating the inner mechanism of the recording apparatus 1. The recording apparatus 1 includes an ejection head 4 that ejects liquid.

The ejection head 4 in the present embodiment is a recording head that ejects ink fed from each of containers 5 to the recording medium to perform recording thereon. The ejection head 4 has an ejection surface **4*a*** formed with a plurality of nozzles that eject the ink. Each of the nozzles is provided with, e.g., an electrothermal conversion element (heater), and the electrothermal conversion element heats the ink by electrification to bubble the ink and eject the ink with the resulting bubbling energy.

The ejection head 4 is mounted on a carriage 6. The carriage 6 reciprocates in the X-direction (main scanning direction) by a drive unit (not shown). The drive unit includes a driver pulley (not shown) and a driven pulley **7*b* which are arranged to be spaced apart from each other in the X-direction, an endless belt 7*c* wound around these pulleys, and a carriage motor 7*a* serving as a drive source that rotates the driver pulley (not shown in FIG. 2; see FIG. 8). The carriage 6 is connected to the endless belt 7*c* to travel with the endless belt 7*c* and thereby the carriage 6 is moved in the X-direction. In the process of the movement of the carriage 6, the ink is ejected from the ejection head 4** onto the recording medium to record an image on the recording medium. This operation may be referred to also as recording scan.

Thus, the recording apparatus 1 in the present embodiment is a serial-type ink jet recording apparatus in which the ejection head 4 is mounted on the reciprocating carriage 6. However, the recording apparatus to which the present invention is applicable is not limited thereto. The present invention is also applicable to another recording apparatus such as, e.g., an ink-jet recording apparatus including a so-called full-line-head ejection head (recording head) in which a plurality of nozzles that eject liquid are provided over a region corresponding to a width of the recording medium.

The recording apparatus 1 includes a single-sheet paper feeding unit **8*a* that conveys the single-sheet paper, a continuous paper feeding unit 8*b* that conveys the continuous paper, and a conveyance unit 9. First, the single-sheet paper is conveyed from the single-sheet paper feeding unit 8*a* toward a recording portion in which the ejection head 4 is disposed and subsequently conveyed by the conveyance unit 9, while image recording is performed thereon. In a case where the continuous paper is the roll paper, a sheet-shaped portion of the roll paper pulled out from a roll-shaped portion thereof is first conveyed by the continuous paper feeding unit 8*b* toward the recording portion, and further conveyed by the conveyance unit 9**, while image recording is performed thereon. A conveyance path for the single-sheet paper and a conveyance path for the continuous paper join together before the recording portion to result in a common conveyance path from a junction point through the recording portion to subsequent paper discharge. Details thereof will be described later.

The single-sheet paper feeding unit 8*a* includes, as a first containing portion, a loading portion 810 on/in which a plurality of sheets of the single-sheet paper can be loaded/contained and a separable feeding portion 820 capable of separating the plurality of sheets of single-sheet paper loaded on the loading portion 810 one by one and feeding each of the sheets of single-sheet paper to the conveyance path. To the separable feeding portion 820, power is transmitted from the drive source (not shown) to allow the separable feeding portion 820 to operate.

Figure 7:
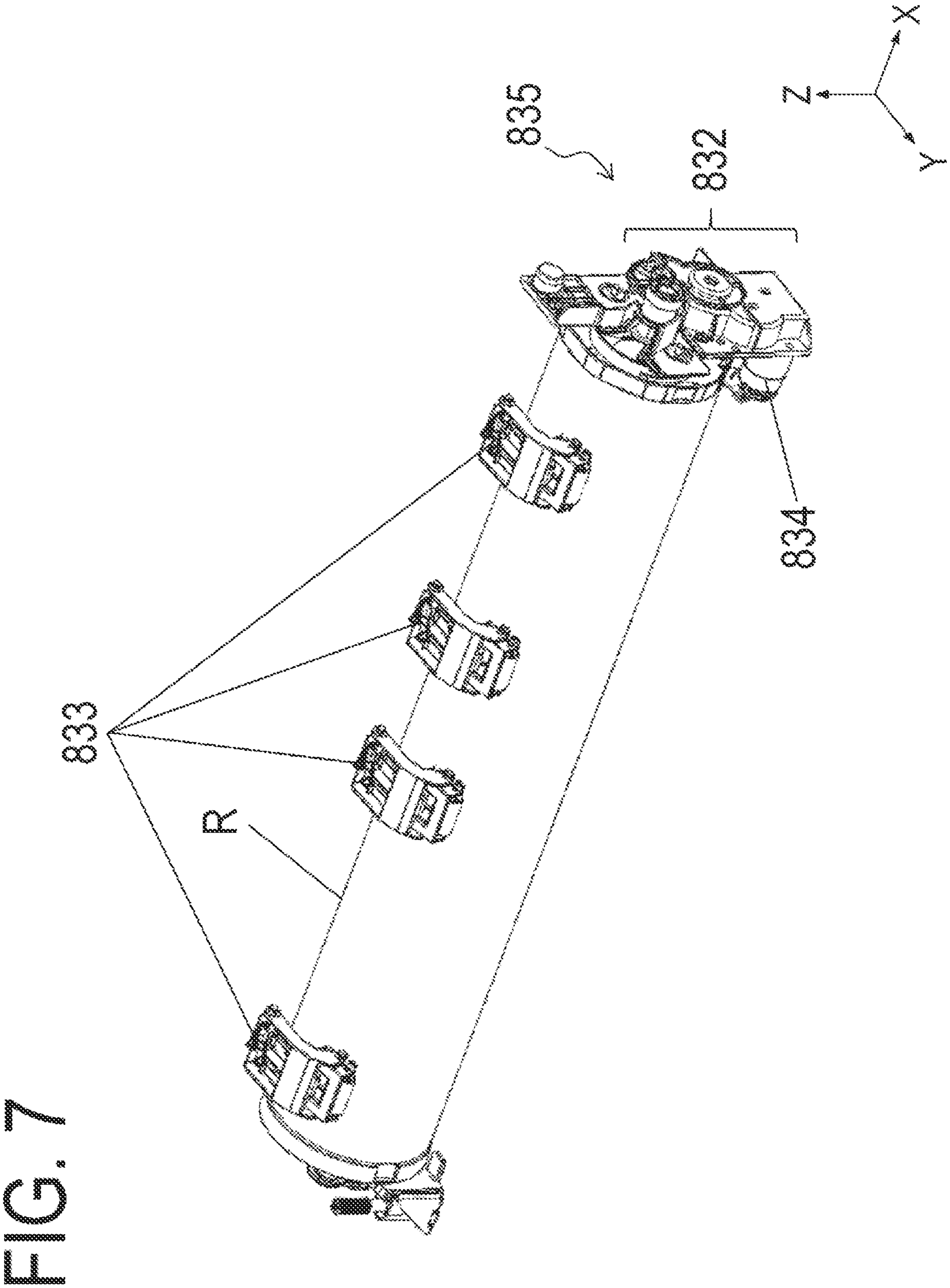
FIG. 7 is a perspective view illustrating a state where the roll paper is set in a roll set portion in the present embodiment.

The continuous paper feeding unit 8*b* includes, as a second containing portion, a roll set portion 8*c* serving as a holding portion in which the roll paper corresponding to the continuous paper wound in a roll shape is rotatably held/placed and a continuous paper feeding mechanism 835 (see FIG. 7). The continuous paper feeding mechanism 835 performs a paper feeding operation of rotating a roll-shaped portion Ra of roll paper R held by the roll set portion 8*c* and feeding a sheet-shaped portion Rb pulled out from the roll-shaped portion Ra toward the recording portion. The continuous paper feeding mechanism 835 also performs an operation of rotating the roll-shaped portion Ra in a direction reverse to that in the paper feeding operation and winding the sheet-shaped portion Rb into the roll-shaped portion Ra. The continuous paper feeding mechanism 835 transmits, to flanges 830 (described later), a drive force generated from a motor 834 serving as a power source via a gear train 832 to rotate the roll-shaped portion Ra of the roll paper R.

Figure 4:
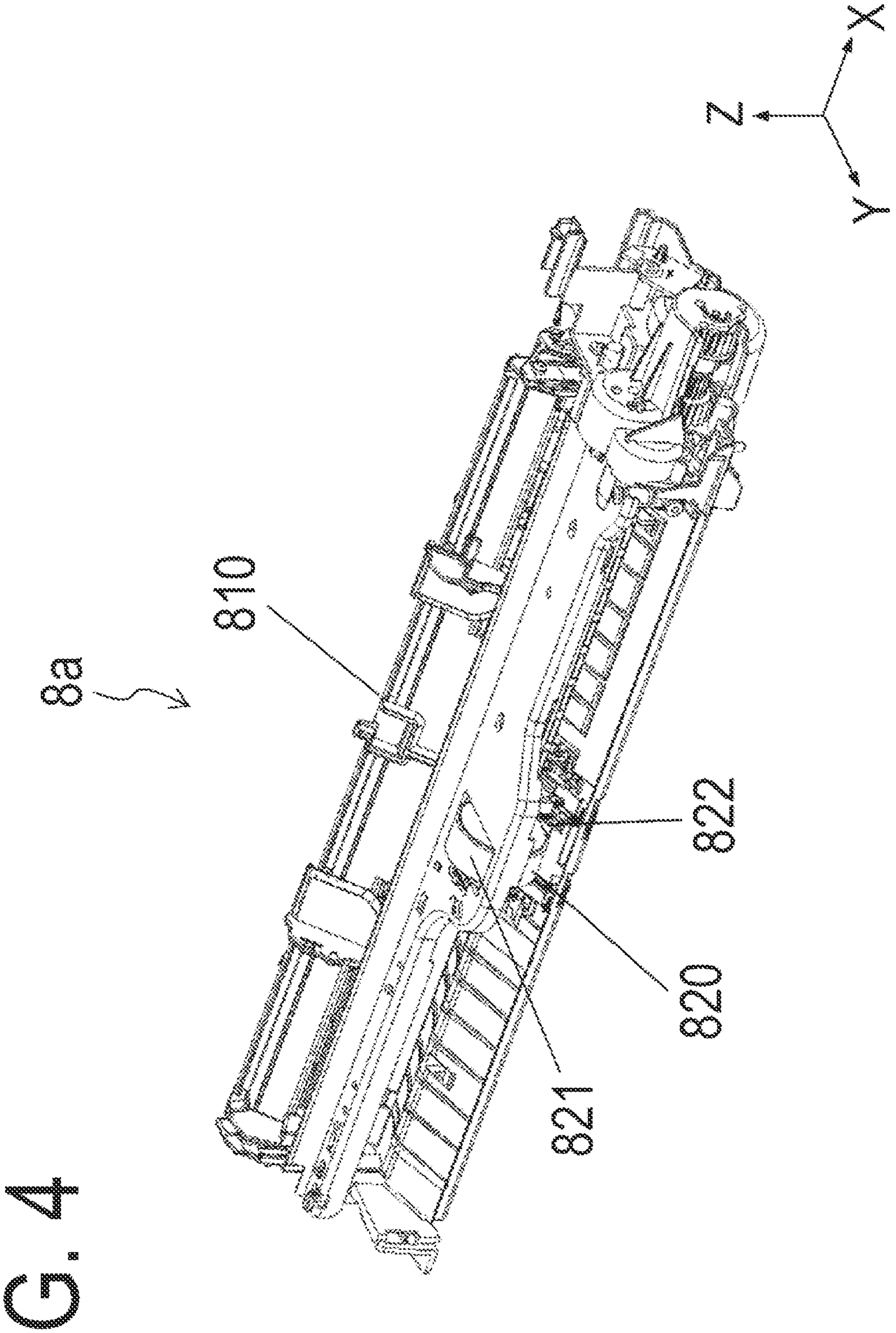
FIG. 4 is a perspective view according to a single-sheet paper feeding unit in the present embodiment.
Figure 5:
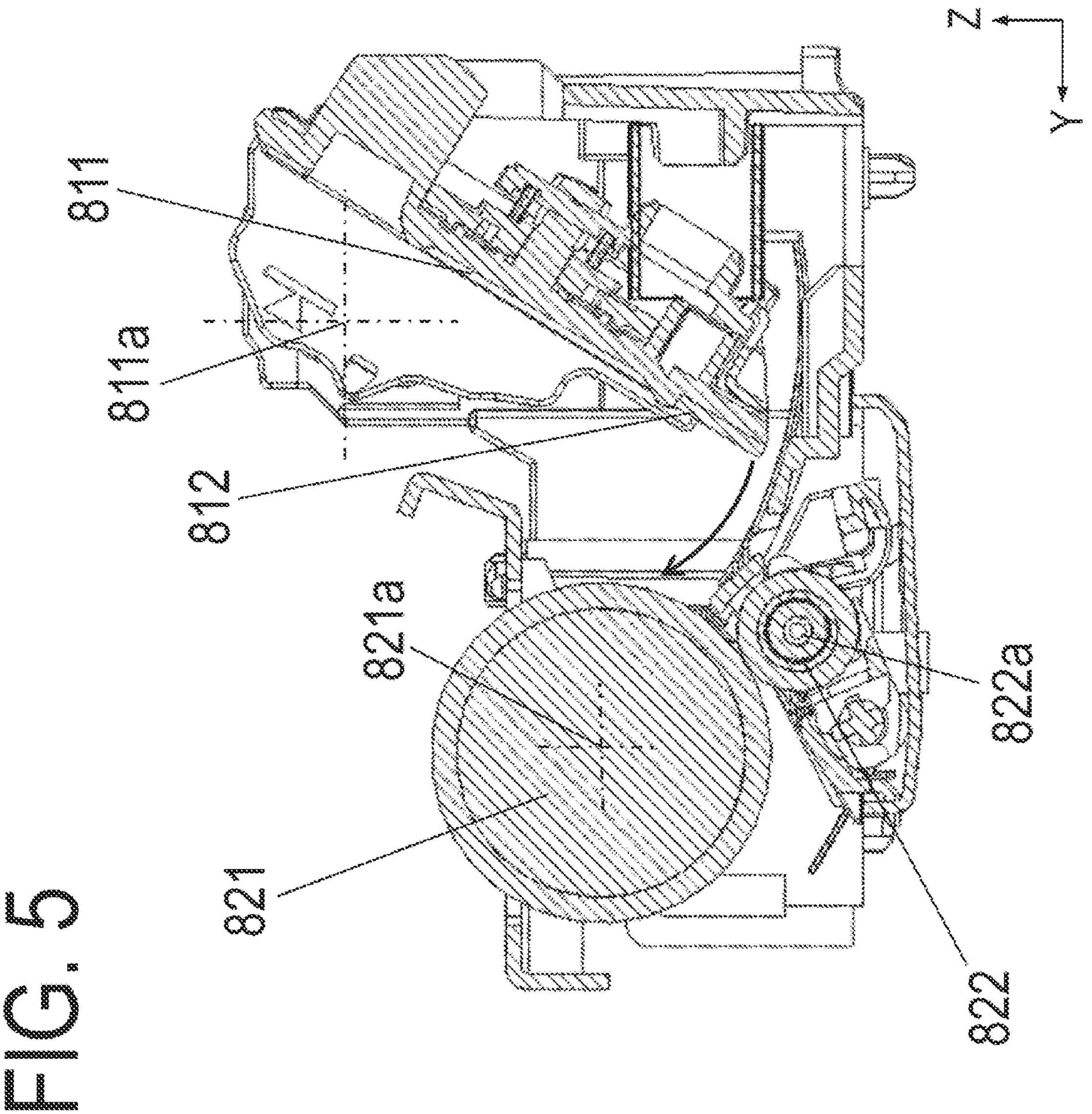
FIG. 5 is a cross-sectional view according to the single-sheet paper feeding unit in the present embodiment.

Referring to FIGS. 4 and 5, a detailed description will be given of the single-sheet paper feeding unit 8*a* in the present embodiment. FIG. 4 is a perspective view of the single-sheet paper feeding unit, and FIG. 5 is a schematic cross-sectional view of the single-sheet paper feeding unit.

In the single-sheet paper feeding unit 8*a*, as a part of the loading portion 810, a pressure plate 811 is rotatably provided around a rotation axis 811*a* parallel to the width direction (X-direction) of the recording paper perpendicular to the direction in which the recording paper is conveyed. On a widthwise middle portion of a downstream-side end portion of the pressure plate 811 in the direction in which the single-sheet paper is conveyed, a separation pad 812 is provided. In the separable feeding portion 820, a pickup roller 821 is provided at a position corresponding to the separation pad 812 in the width direction, while a separation roller 822 is provided at a position facing the pickup roller 821 on a side downstream of the separation pad 812 in the conveying direction. The pickup roller 821 and the separation roller 822 are rotatably provided around rotation axes 821*a* and 822*a* each parallel to the width direction (X-direction), and the separation roller 822 is configured so as to rotate following the rotation of the pickup roller 821.

A description will be given of a method of separably feeding the single-sheet paper. When the drive source (not shown) rotates, the pickup roller 821 begins to rotate around the rotation axis 821*a*. At the same time, the pressure plate 811 held down by a cam (not shown) pivots in the arrow direction in FIG. 5 toward the pickup roller 821 under a pressing force of a spring (not shown) to press the loaded single-sheet paper against the pickup roller 821. As a result, the uppermost one of the plurality of sheets of single-sheet paper loaded on the loading portion 810 is fed out to a downstream side in the conveying direction. The fed-out sheet of single-sheet paper comes closer to a nip formed by contact between the pickup roller 821 and the separation roller 822. The separation roller 822 is provided with a torque limit mechanism, and rotates following the pickup roller 821 when one sheet of the single-sheet paper enters the nip. When two stacked sheets of the single-sheet paper enter the nip, the sheets of single-sheet paper slide against each other to keep a rotating force from being transmitted to the separation roller 822, and the separation roller 822 remains stationary. The lower sheet of single-sheet paper is held down by the separation roller 822, while only the upper sheet of single-sheet paper is conveyed. Thus, the sheets of single-sheet paper are separately conveyed.

In the present embodiment, a separation mechanism based on friction as described above is used, but the separation mechanism from which the effects of the present invention are obtainable is not limited thereto. For example, from an apparatus using adsorption separation using air or the like also, the effects of the present invention are obtainable.

Figure 6:
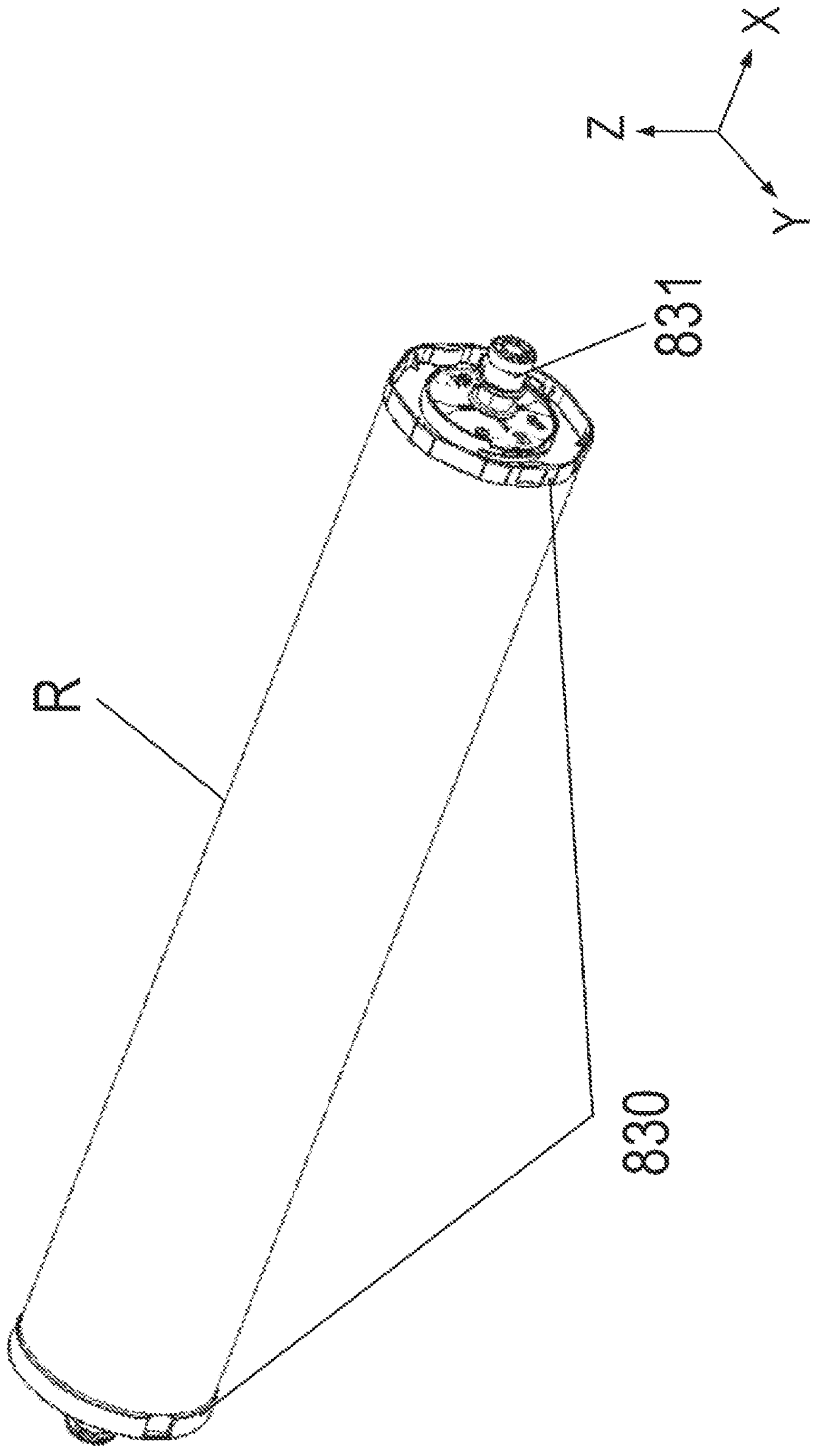
FIG. 6 is a perspective view illustrating a state where flanges are set in roll paper in the present embodiment.

Referring to FIGS. 6 and 7, a description will be given of the continuous paper feeding unit 8*b* in the present embodiment. FIG. 6 is a perspective view illustrating a state where the flanges 830 are set in the roll paper serving as the continuous paper. FIG. 7 is a perspective view illustrating a state where the roll paper serving as the continuous paper is set in the roll set portion 8*c*.

It is assumed that, as the continuous paper in the present embodiment, the roll paper R in which the elongated recording paper is wound into a roll shape is used. However, the continuous paper is not limited to the roll paper to obtain the effects of the present invention, and, e.g., the continuous paper in a form in which the elongated recording paper is folded may also be used.

As illustrated in FIG. 6, the flanges 830 are set into both ends of the roll paper R. In a state where the flanges 830 are set, as illustrated in FIG. 7, the roll paper R is set into the roll set portion 8*c*. The roll paper R is supported such that the flanges 830 attached to both ends thereof are rotatable with respect to the roll set portion 8*c*. The flanges 830 receive the drive force and rotate to rotate the roll paper R. One end portion of each of the flanges 830 is provided with a flange gear 831, which is drive-connected to the gear train 832 of the continuous paper feeding mechanism 835. As a result, a rotational drive force fed from the motor 834 serving as the power source is transmitted via the flange gears 831 and the flanges 830 to the roll paper R to allow a feeding operation based on normal rotation and a winding operation based on reverse rotation to be performed. After the roll paper R is set, when the paper feeding cover 301 is closed, with the roll paper R, a nip roller 833 comes into pressure contact. Consequently, when the roll paper R rotates, it is possible to give a conveying force to the roll paper R and feed the sheet-shaped portion Rb separated from the roll-shaped portion Ra into the continuous paper conveyance path with a leading end thereof at the head.

As illustrated in FIG. 3, the recording paper conveyance path in the recording apparatus 1 is configured as follows. The single-sheet paper conveyed from the single-sheet paper feeding unit 8*a* via the separable feeding portion 820 is conveyed through a single-sheet paper conveyance path 840 defined to extend between the separable feeding portion 820 and a junction point 850 as a first conveyance path extending from the loading portion 810 to the junction point 850. After passing through the junction point 850, the single-sheet paper is sent to conveyance rollers 9*a* of the conveyance unit 9 (described later). The continuous paper fed from the continuous paper feeding unit 8*b* is conveyed through a continuous paper conveyance path 860 (second conveyance path) defined to extend between a continuous paper insertion port 861 in the vicinity of the roll set portion 8*c* and the junction point 850 as a second conveyance path extending from the roll set portion 8*c* to the junction point 850. The continuous paper is sent to the conveyance rollers 9*a* after the sheet-shaped portion Rb drawn out from the roll-shaped portion Ra passes through the junction point 850.

On a downstream side of the junction point 850 in the recording paper conveying direction, a common conveyance path 890 through which each of the single-sheet paper and the continuous paper is conveyed is provided. On an upstream side of the conveyance rollers 9*a* in the common conveyance path 890, a recording paper detecting sensor 870 that detects the single-sheet paper and the continuous paper is provided. The recording paper detecting sensor 870 detects a leading end and a rear end of the recording paper and functions as a trigger for each of a cuing operation during recording operation control, rear end processing, and operations during paper feeding and paper discharge or the like.

A specific configuration of the recording paper detecting sensor 870 is not particularly limited, and it may be possible to use e.g., an optical sensor. In other words, it may be possible to provide a configuration in which a light emitting portion and a light receiving portion are provided, and detecting light emitted from the light emitting unit toward the conveyance path is blocked by the recording paper to change a light receiving state of the light receiving portion and thereby effect intended detecting. Alternatively, it may also be possible to use a mechanical sensor in which a contact maker provided to be able to advance/retract with respect to the conveyance path comes into contact with the recording paper to detect the presence or absence of the recording paper. The same applies also to a continuous paper detecting sensor 880 (described later).

On an upstream side of the junction point 850 in the continuous paper conveyance path 860, the continuous paper detecting sensor 880 is provided. The continuous paper detecting sensor 880 is used when recording target switching is performed between the single-sheet paper and the continuous paper. When, e.g., switching is performed from a recording operation for the continuous paper to a recording operation for the single-sheet paper, the continuous paper is rewound until the continuous paper detecting sensor 880 detects the absence of the recording paper. Then, the continuous paper is sent again by the continuous paper feeding mechanism 835, and the feeding is continued until the continuous paper detecting sensor 880 detects the presence of the recording paper. When the recording operation is performed again with respect to the continuous paper, the continuous paper feeding mechanism 835 is operated to be able to send the continuous paper to the conveyance rollers 9*a*.

Note that, to merely rewind the continuous paper, the same operation can be performed by mere control of an amount of winding from the recording paper detecting sensor 870 located downstream of the junction point 850. However, when the power source is turned off, a position of the leading end of the continuous paper becomes unstable, and the feeding can no longer be performed again. In this mode in which the continuous paper detecting sensor 880 is mounted, after the power source is turned on, the continuous paper detecting sensor 880 detects the presence of the paper and, when recording is performed on the continuous paper, by operating the continuous paper feeding mechanism 835, it is possible to perform automatic feeding without user intervention.

The conveyance unit 9 is a mechanism that conveys the recording paper fed from the single-sheet paper feeding unit 8*a* or the continuous paper feeding unit 8*b* in the Y-direction (sub-scanning direction). The conveyance unit 9 includes the conveyance rollers 9*a* and a conveyance motor 9*b* (see FIG. 8) serving as a drive source that rotates the conveyance rollers 9*a*. With the conveyance rollers 9*a*, pinch rollers 9*c* (see FIG. 2) are in pressure contact, and the recording paper is held in a nip portion formed therebetween. By the rotation of the conveyance rollers 9*a*, the recording paper is intermittently conveyed to a recording region facing the ejection surface 4*a* of the ejection head 4. The recording operation is performed by alternately repeating an operation of conveying the recording paper by the conveyance unit 9 and recording scan. When the recording operation is ended, the recorded recording paper is held in a paper discharge nip portion formed between paper discharge rollers 9*d* disposed downstream of the recording region and the pinch rollers in pressure contact therewith (not shown), and discharged to the discharge portion 10 by the rotation of the discharge rollers 9*d*.

In the case of the present embodiment, the containers 5 (5C, 5M, 5Y, and 5Bk) each containing the ink are stationary containers fixed to the recording apparatus 1. When an amount of the remaining ink decreases, an operator refills each of the containers 5 with the ink without detaching the container 5 from the recording apparatus 1. The containers 5C, 5M, 5Y, and 5Bk are containers each having the same structure and present due to different colors of the ink contained therein, which are arranged in the Y-direction on a right side surface of a front part of the recording apparatus 1, as illustrated in FIG. 2. The containers 5C to 5Bk have respective upper portions covered with a common tank cover portion 13.

Figure 8:
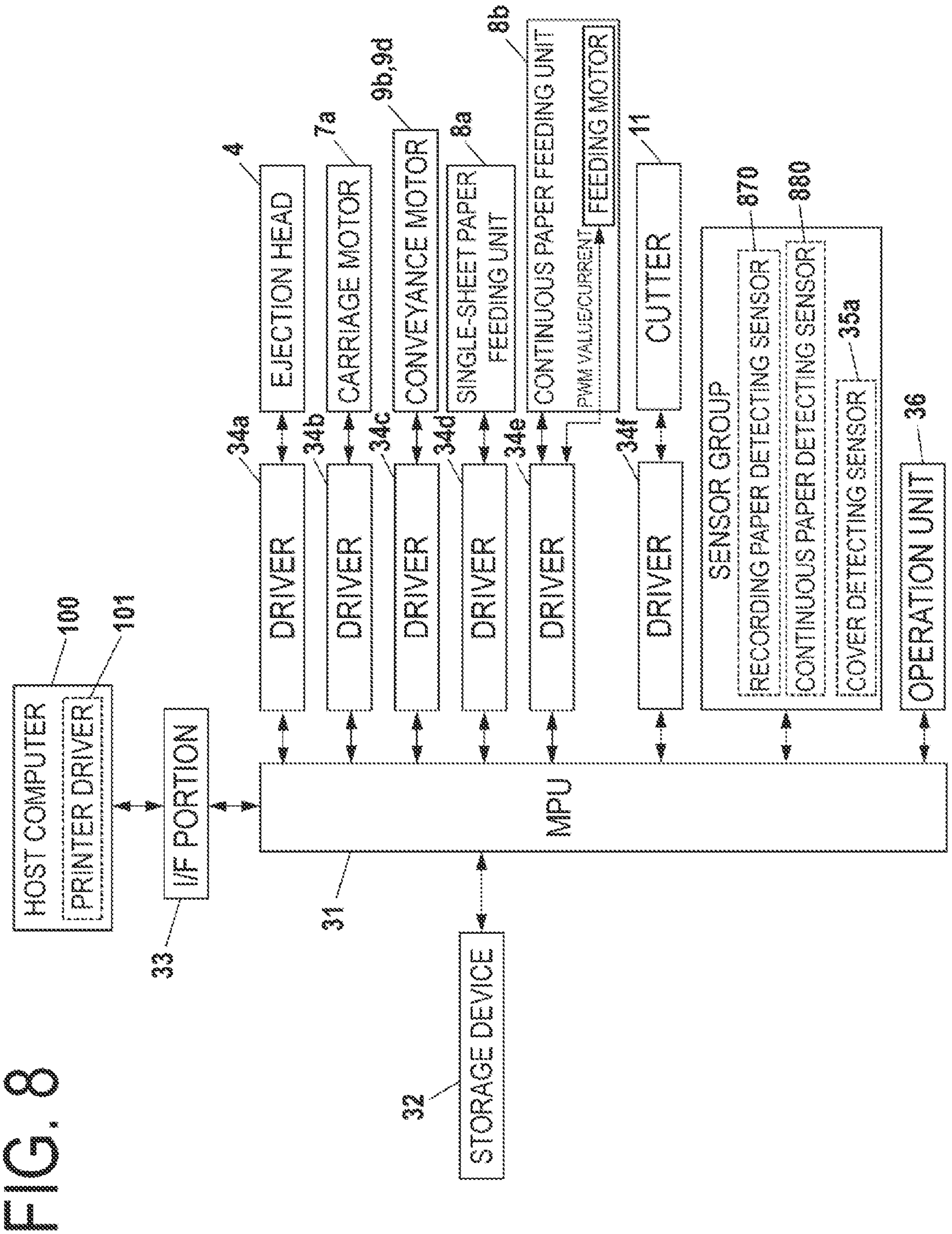
FIG. 8 is a block diagram of a control unit in the present embodiment.

FIG. 8 is a block diagram of the control unit 30 of the recording apparatus 1. An MPU 31 is a processor (control portion) that controls each operation of the recording apparatus 1, processing of data, and the like. The MPU 31 executes a program stored in a storage device 32 to control the entire recording apparatus 1. The storage device 32 is configured to include, e.g., a ROM or a RAM. In the storage device 32, various data required for processing such as not only the program to be executed by the MPU 31, but also data received from a host computer 100 is stored.

The MPU 31 controls the ejection head 4 via a driver 34*a*. The MPU 31 controls the carriage motor 7*a* via a driver 34*b*. The MPU 31 also controls, as a conveyance control portion, the conveyance motor 9*b*, the single-sheet paper feeding unit 8*a*, and the continuous paper feeding unit 8*b* via drivers 34*c*, 34*d*, and 34*e*. The MPU 31 also controls a cutting operation by a cutter 11 via a driver 34*f*.

The MPU 31 also acquires detecting results from a sensor group 35 including various sensors provided in the recording apparatus 1 and performs a control operation. The sensor group 35 includes the recording paper detecting sensor 870, the continuous paper detecting sensor 880, and a cover detecting sensor 35*a*. The MPU 31 also controls the display on the display portion of the operation unit 36 and receives the operation from the user to the operation unit 36.

The host computer 100 is, e.g., a personal computer or a mobile terminal (such as, e.g., a smartphone or a tablet terminal) used by the user. In the host computer 100, a printer driver 101 that performs communication between the host computer 100 and the recording apparatus 1 is installed. The recording apparatus 1 includes an interface portion 33, and the communication between the host computer 100 and the MPU 31 is performed via the interface portion 33. When, e.g., execution of a recording operation is input from the user to the host computer 100, the printer driver 101 compiles settings (information such as a quality of a recorded image) related to data on an image to be recorded and recording thereof to give, to the recording apparatus 1, an instruction to execute the recording operation.

Figure 9:
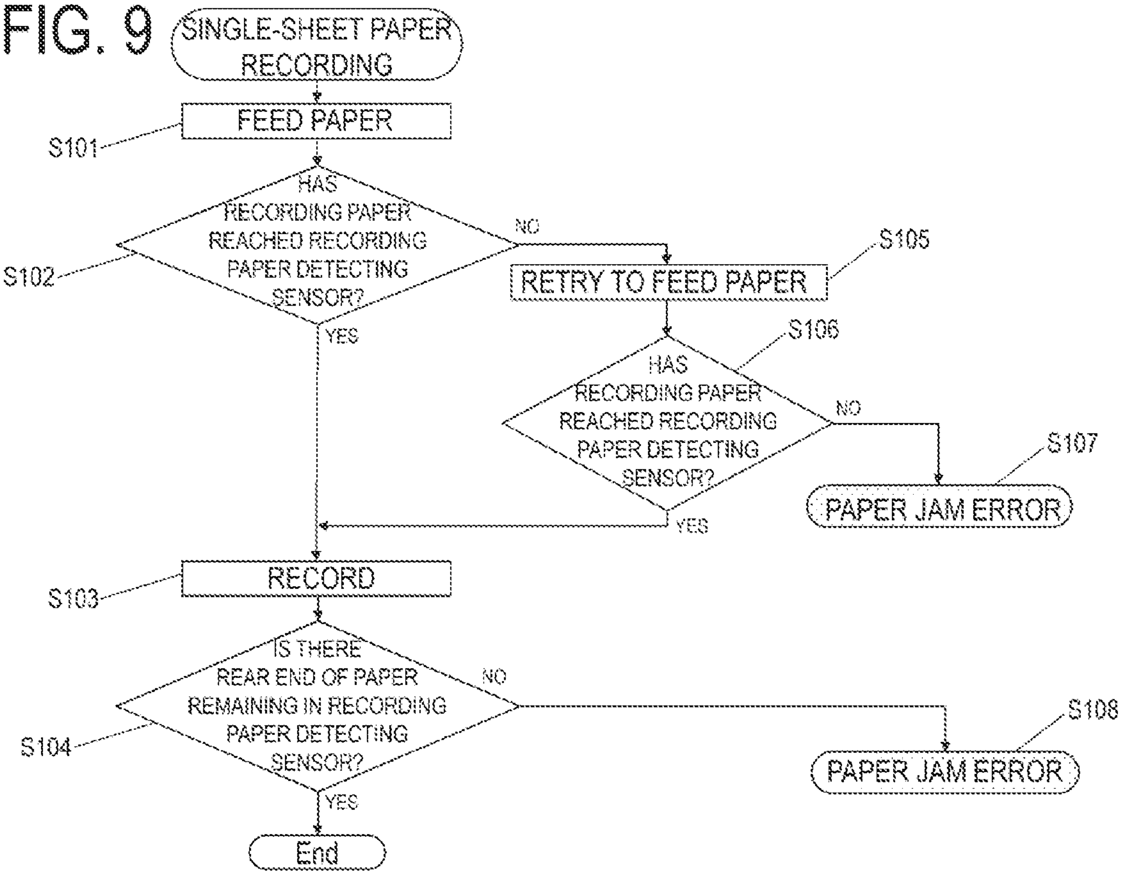
FIG. 9 is a diagram illustrating a single-sheet paper recording flow in the present embodiment.
Figure 10:
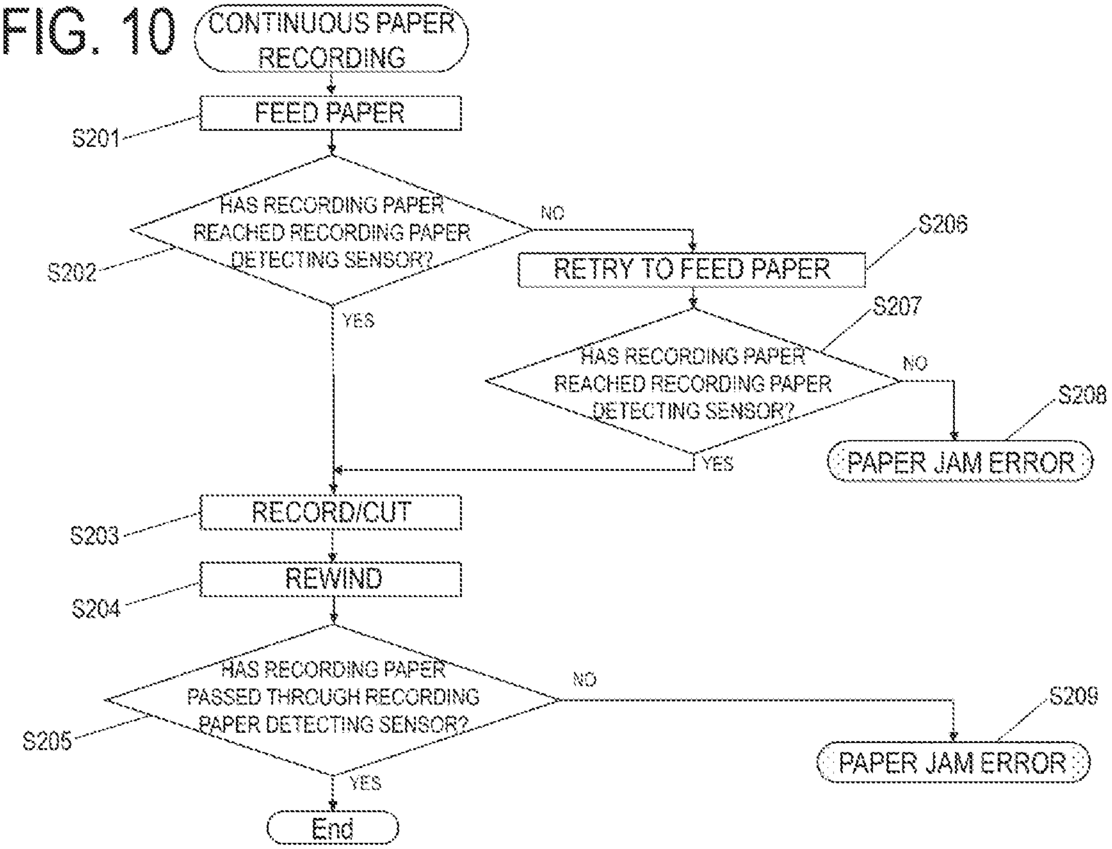
FIG. 10 is a diagram illustrating a continuous paper recording flow in the present embodiment.

Referring to FIGS. 9 and 10, a description will be given of a flow of the recording operation and jam determination in the present embodiment.

FIG. 9 illustrates a flow of the recording operation (printing) with respect to the single-sheet paper. In S101, paper feeding is performed. Then, in S102, it is determined whether or not a leading end of the single-sheet paper has reached a detecting position in the recording paper detecting sensor 870. When the single-sheet paper has reached there, the flow advances to the recording operation in S103. When the single-sheet paper has not reached there, i.e., when the recording paper detecting sensor 870 serving as a first detecting unit does not detect the recording paper even after a lapse of a predetermined period after conveyance of the recording paper to the recording portion is started in the recording operation, a paper feeding retry operation in S105 is performed. Then, it is determined again in S106 whether or not the single-sheet paper has reached the recording paper detecting sensor 870 and, when the single-sheet paper has not reached there, a paper jam error is determined as a conveyance abnormality in S107. Even after the recording operation is ended, it is determined in S104 whether or not a rear end of the single-sheet paper is remaining at the detecting position in the recording paper detecting sensor 870. When the single-sheet paper is remaining, i.e., when the recording paper detecting sensor 870 detects the recording paper even after a lapse of a predetermined period after a discharge operation of conveying the recorded recording paper to the outside of the apparatus is started, the paper jam error is determined in S108.

FIG. 10 is a flow of the recording operation with respect to the continuous paper. The continuous paper recording flow is the same as the single-sheet paper recording flow up to the recording operation flow in S203, and therefore a description thereof is omitted. After the recording, when the recording paper is the continuous paper, an operation of cutting the continuous paper is performed. In other words, using the cutter 11, a recorded region of the continuous paper is cut as the recorded recording paper from an unrecorded region of the continuous paper. The cutter 11 is provided downstream of the recording portion in the conveyance path, and the continuous paper is conveyed in the paper discharge direction until a boundary position between the recorded region and the unrecorded region each described above matches a position of the cutting by the cutter 11. The cutter 11 is configured to be able to advance/retract with respect to the conveyance path, and separates the recorded region from the unrecorded region at the boundary position mentioned above.

When the cutting operation by the cutter 11 is ended, the recorded recording paper corresponding to the separated recorded region of the continuous paper is subsequently discharged to the outside of the apparatus while, in S204, a continuous paper discharge operation of rewinding the unrecorded region of the continuous paper is performed. At that time, the leading end of the continuous paper is retracted to a position upstream of the junction point 850 so as not to stand in the way at the time of the recording on the single-sheet paper. When the retracting rewinding operation is performed, in S205, it is determined whether or not the continuous paper has passed through the detecting position in the recording paper detecting sensor 870. When the continuous paper has not normally passed therethrough, i.e., when the recording paper detecting sensor 870 detects the recording paper even after a lapse of a predetermined period after reverse conveyance of the continuous paper is started, the paper jam error is determined on the assumption that the continuous paper is caught somewhere and remaining.

A predetermined period used for the determination of the paper jam error by the recording paper detecting sensor 870 described above may be set as a threshold time period acquired from, e.g., a speed of the conveyance of the recording paper and from conveyance distances between the individual components in the conveyance path in accordance with an apparatus configuration.

Jam Handling Method

Figure 11A:
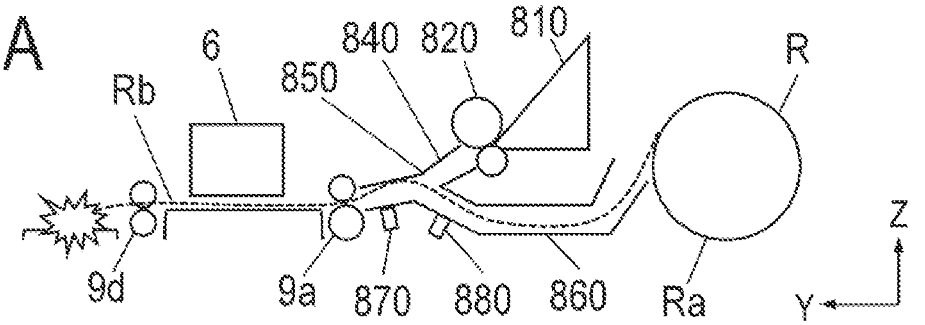
FIGS. 11A to 11D are schematic diagrams illustrating a jammed state assumed in the recording apparatus in the present embodiment.
Figure 11B:
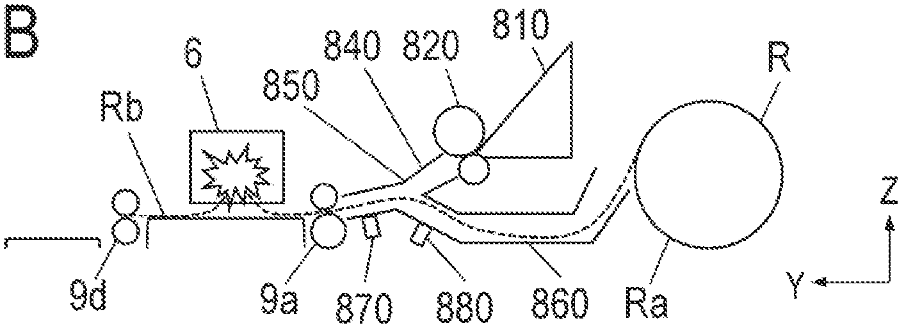
Figure 11C:
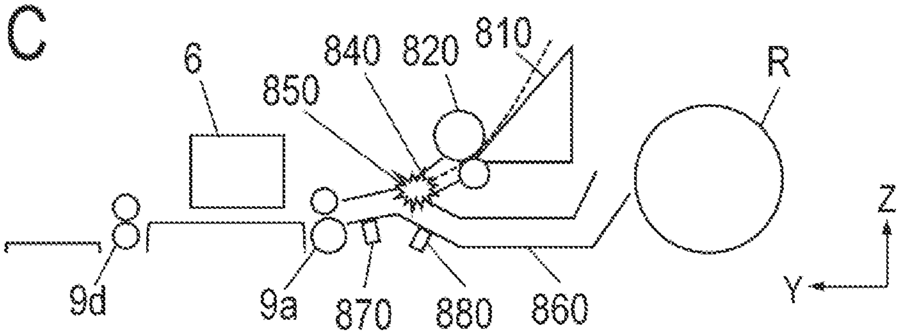
Figure 11D:
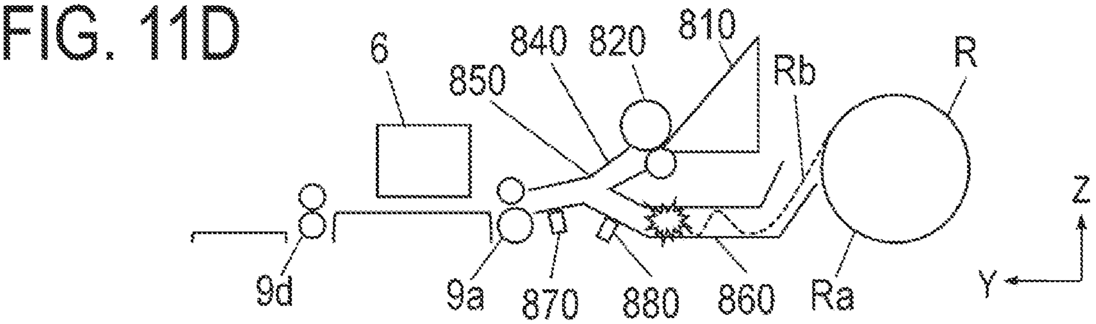
Figure 12:
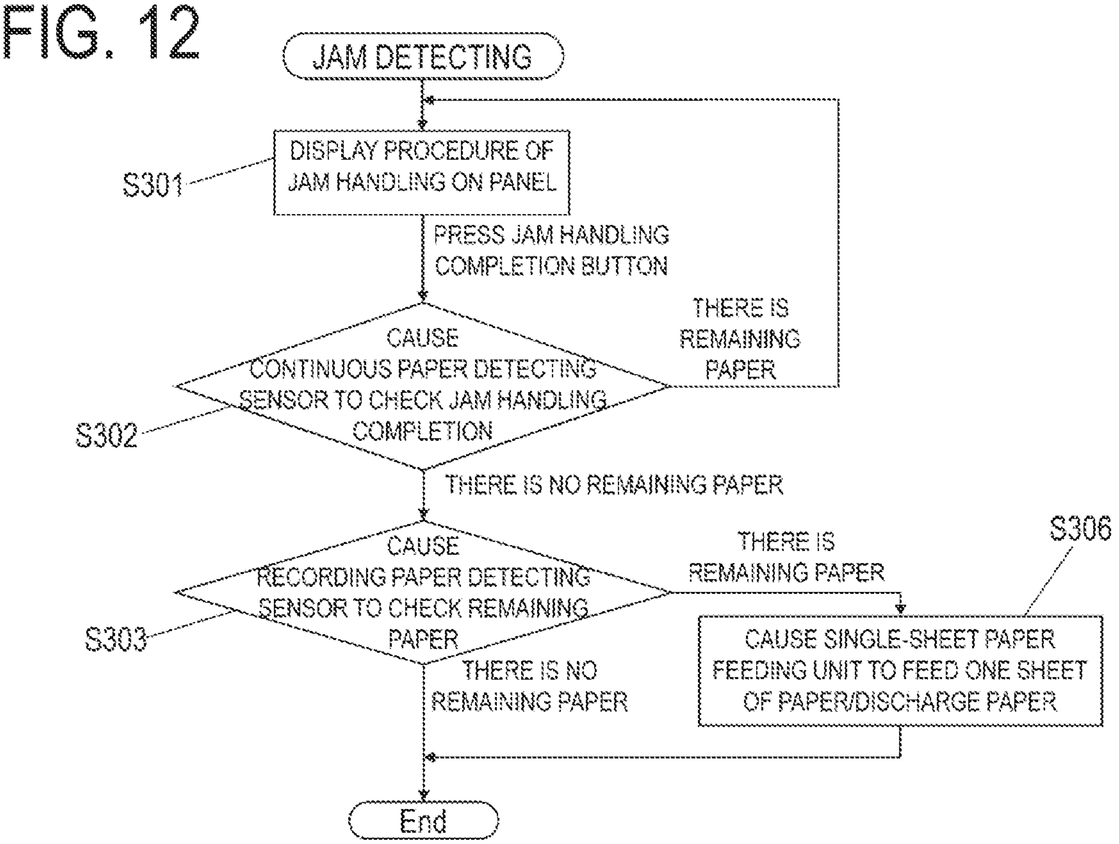
FIG. 12 is a diagram illustrating an example of a jam handling flow in the present embodiment.
Figure 13:
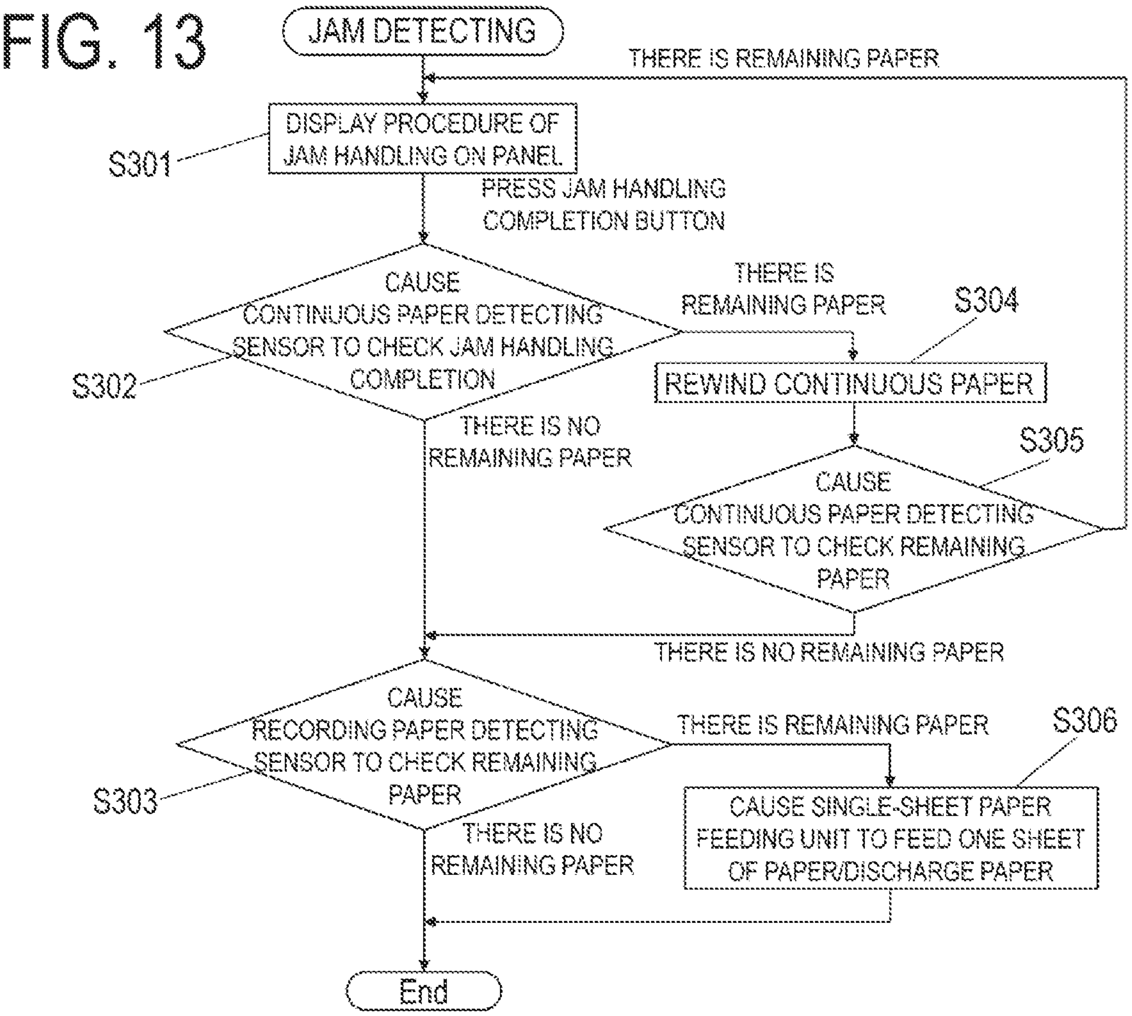
FIG. 13 is a diagram illustrating another example of the jam handling flow in the present embodiment.

Referring to FIGS. 11A to 11D, FIG. 12, and FIG. 13, a method of jam handling after the occurrence of a jam in the recording apparatus in the embodiment will be described. FIGS. 11A to 11D are schematic diagrams illustrating a jammed state assumed in the recording apparatus in the present embodiment. FIG. 12 is a diagram illustrating an example of a jam handling flow in the present embodiment. FIG. 13 is a diagram illustrating another example of the jam handling flow in the present embodiment.

As illustrated in FIGS. 11A to 11D, as representative jam patterns in the recording apparatus in the present embodiment, the following examples are assumed.

1) A jam in a state where the recorded recording paper jams in the paper discharge portion (FIGS. 11A to 11D)
2) Interference between the carriage 6 and the recording paper due to floating of the recording paper in the recording region (FIG. 11B)
3) A jam in the single-sheet paper conveyance path 840 (FIG. 11C)
4) A jam in the continuous paper conveyance path 860 (FIG. 11D)

In a normal jam handling procedure in the present recording apparatus, in a jammed state as described above, in a case of a jam of the continuous paper, the user cuts the continuous paper in the vicinity of the roll. Then, the user pulls out the continuous paper in the paper discharge direction to remove the recording paper. As necessary, the access cover 302 is opened, and the remaining paper is removed. In a case of the single-sheet paper, jam handling is performed by pulling out, in a direction of a paper discharge port, the recording paper that can be pulled out in the direction of the paper discharge port and thereby removing the recording paper and by pulling out the recording paper remaining in the vicinity of the loading portion 810 to the rear of the recording apparatus.

When the jam handling is performed in a procedure as described above, it may be possible in very rare cases that the recording paper is torn to remain in a user inaccessible area upstream of the conveyance rollers 9*a*. In addition, when recording paper smaller than recording paper sizes according to the specification is fed from the single-sheet paper feeding unit 8*a* also, the recording paper does not reach the conveyance rollers 9*a* and remains there, resulting in a jam.

A handling method in such a case will be described using an example of the jam handling flow illustrated in FIG. 12. In the recording apparatus in the present embodiment, in S301, notifying is performed in which the display portion of the operation unit 36 displays the procedure of the jam handling to be manually performed by the user to encourage the user to perform the jam handling. After performing the jam handling with respect to all the processible recording paper sheets, the user performs the processing of inputting jam handling completion to the input portion of the operation unit 36. Then, in S302, it is determined first whether or not the recording paper is remaining at the detecting position in the continuous paper detecting sensor 880 and, when the recording paper is remaining there, the user is encouraged again to perform the jam handling in the continuous paper conveyance path 860.

At this time, it may also be possible to adopt a mode in which the roll is automatically rewound as in S304 instead of encouraging the user to perform the jam handling as in, e.g., the other example of the jam handling flow illustrated in FIG. 13. By going through this operation, the continuous paper is retracted from the common conveyance path 890, and the subsequent recording paper conveying operation by the conveyance rollers 9*a* prevents the continuous paper from being pulled out. In this case, in S305, it is determined whether or not the recording paper is remaining at the detecting position in the continuous paper detecting sensor 880 serving as a second detecting unit and, in such a case where roll rewinding cannot normally be performed and the recording paper is remaining, the user is encouraged again to perform the jam handling in the continuous paper conveyance path 860.

Then, in S303, the recording paper detecting sensor 870 in the vicinity of the conveyance rollers 9*a* determines the remaining recording paper. When the remaining recording paper is not detected, the jam handling is completed herein, and an initializing operation for the apparatus is performed. When the remaining recording paper is detected, in S306, one sheet of the recording paper is conveyed from the single-sheet paper feeding unit 8*a*, and a jammed paper lead-out operation of leading out and discharging a paper piece, out-of-specification small-sized paper, or the like remaining on the recording paper detecting sensor 870 upstream of the conveyance rollers 9*a* is performed. This is the operation performed in the expectation that friction and snagging of the fed recording paper moves the remaining paper piece in the discharge direction. Then, the sensor state is checked again and, when there is no recording paper on each of the sensors, the flow of the jam handling is completed.

In the jam handling flow illustrated in FIG. 13, when a mode in which the roll is automatically rewound is adopted in S304, as described above, there is a case where the roll cannot normally be wound. For example, a case where a leading end of the roll is held between the conveyance rollers 9*a* or a case where the leading end of the roll is caught in the continuous paper conveyance path 860 can be considered. In that case, it may be possible to provide a configuration which detects whether or not overload has occurred in the continuous paper feeding mechanism 835 serving as a drive unit that rewinds the roll, determine a recording paper jam error, stop a rewinding operation, and encourage the user to perform the jam handling. The overload may be detected by the MPU 31 serving as a third detecting unit by detecting whether or not a control PWM of the motor 834 has exceeded a prescribed value. In other words, the MPU 31 may detect a drive current flowing in the motor 834, detect whether or not the detected current value exceeds a predetermined threshold, and thereby detect the occurrence of the overload in the motor 834 (a magnitude of a load on the motor 834 having exceeded a predetermined magnitude). When the overload is detected, the rewiring operation is stopped, and the user is encouraged again to perform the jam handling.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-012084, filed on Jan. 28, 2022, which is hereby incorporated by reference herein in its entirety.

What is claimed is:

1. A recording apparatus comprising:

a recording portion that records an image on a sheet;

a first conveyance path in which a cut sheet serving as the sheet is conveyed toward the recording portion;

a second conveyance path in which a continuous sheet serving as the sheet is conveyed toward the recording portion;

a common conveyance path in which the sheet is conveyed in a conveying direction from a junction point at which the first conveyance path and the second conveyance path join together to the recording portion; and a control portion that controls conveyance of the sheet, wherein, in a case where the sheet is not detected in the second conveyance path after a sheet conveyance abnormality is detected, the control portion performs a discharge operation of conveying the cut sheet from the first conveyance path toward the recording portion.

2. The recording apparatus according to claim 1, further comprising:

a first detecting unit disposed in the common conveyance path to detect the sheet; and a second detecting unit disposed in the second conveyance path to detect the sheet.

3. The recording apparatus according to claim 1, wherein, in a case where the sheet is detected in the second conveyance path after the sheet conveyance abnormality is detected, the control portion conveys the continuous sheet in a direction reverse to the conveying direction.

4. The recording apparatus according to claim 1, wherein the continuous sheet is a roll sheet in which the continuous sheet is wound, wherein the recording apparatus further comprises a holding portion that holds the roll sheet, and wherein the continuous sheet is fed from the roll sheet held by the holding portion to the second conveyance path.

5. The recording apparatus according to claim 1, wherein the control portion stops the discharge operation in a case where the sheet is detected in the common conveyance path even after a lapse of a predetermined period after the discharge operation is started.

6. The recording apparatus according to claim 1, further comprising:

a cutter disposed downstream of the recording portion in the conveying direction to cut the continuous sheet.

7. The recording apparatus according to claim 6, wherein, after the continuous sheet is cut, the control portion performs a returning operation of conveying the continuous sheet in a direction reverse to the conveying direction, and stops the returning operation in a case where the sheet is detected in the second conveyance path after a lapse of a predetermined period.

8. The recording apparatus according to claim 1, further comprising:

a notifying portion that notifies a sheet conveyance abnormality to a user.

9. The recording apparatus according to claim 8, further comprising:

an input portion that receives an input of completion of conveyance abnormality handling from the user, and wherein the control portion performs the discharge operation in a case where, after the notifying portion performs notifying to encourage the user to perform the conveyance abnormality handling and the input portion receives the input, a recording paper is not detected in the second conveyance path, while the recording paper is detected in the common conveyance path.

10. The recording apparatus according to claim 9, wherein, in a case where the recording paper is detected in the second conveyance path after the notifying portion performs the notifying and the input portion receives the input, the notifying portion performs the notifying again.

11. The recording apparatus according to claim 9, wherein, in a case where the recording paper is detected in the second conveyance path after the notifying portion performs the notifying and the input portion receives the input, the control portion performs a returning operation of conveying the continuous sheet in a direction reverse to the conveying direction.

12. The recording apparatus according to claim 11, further comprising:

a detecting unit that detects a load occurring in a drive unit that conveys the continuous sheet in the returning operation, and wherein, in a case where a magnitude of the load detected by the detecting unit in the returning operation exceeds a predetermined magnitude, the control portion stops the returning operation, and the notifying portion performs the notifying again.

13. The recording apparatus according to claim 12, wherein the drive unit includes a motor that generates a drive force for conveying the continuous sheet, wherein the detecting unit detects a value of a current flowing in the motor, and wherein, in a case where the current value detected by the detecting unit in the returning operation exceeds a predetermined threshold, the control portion stops the returning operation.

14. The recording apparatus according to claim 13, wherein the continuous sheet is a roll sheet in which the continuous sheet is wound, wherein the recording apparatus further comprises a holding portion that holds the roll sheet, wherein the drive force generated by the motor is a drive force for rotating the roll sheet held by the holding portion, and wherein the returning operation is a rewinding operation of rotating the roll sheet in a direction reverse to that of rotation in a case where the continuous sheet extending from the roll sheet is conveyed toward the recording portion and winding the continuous sheet into the roll sheet.

15. The recording apparatus according to claim 1, wherein after the sheet conveyance abnormality is detected and the sheet is detected in the common conveyance path, the control portion perform the discharge operation.

16. The recording apparatus according to claim 1, further comprising:

an input portion that receives an input of completion of conveyance abnormality handling from a user, wherein after the input portion receives the input, the control portion performs the discharge operation.

* * * * *